(12) United States Patent
Haefner et al.

(10) Patent No.: US 8,979,962 B2
(45) Date of Patent: Mar. 17, 2015

(54) FILTER ELEMENT WITH A GUIDE DUCT THAT PENETRATES ITS PLEATED WALLS

(75) Inventors: Uwe Haefner, Kehl (DE); Dieter Unrath, Weinheim (DE); Roland Dobner, Wald-Michelbach (DE)

(73) Assignee: Carl Freudenberg KG, Weinheim (DE)

( * ) Notice: Subject to any disclaimer, the term of this patent is extended or adjusted under 35 U.S.C. 154(b) by 187 days.

(21) Appl. No.: 13/598,834

(22) Filed: Aug. 30, 2012

(65) Prior Publication Data

US 2013/0068103 A1 Mar. 21, 2013

(30) Foreign Application Priority Data

Sep. 16, 2011 (DE) .......................... 10 2011 113 391
Nov. 8, 2011 (DE) .......................... 10 2011 117 842

(51) Int. Cl.
*B01D 46/52* (2006.01)
*B01D 46/00* (2006.01)
*F24F 13/28* (2006.01)

(52) U.S. Cl.
CPC .......... *B01D 46/521* (2013.01); *B01D 46/0002* (2013.01); *F24F 13/28* (2013.01); *B01D 2265/06* (2013.01)
USPC .................. 55/385.3; 55/497; 55/502; 55/521

(58) Field of Classification Search
USPC ............ 55/497, 498, 501, 502, 521; 454/158, 454/284, 291, 337, 328, 309
See application file for complete search history.

(56) References Cited

U.S. PATENT DOCUMENTS

| 6,387,143 | B1* | 5/2002 | Adiletta | 55/497 |
| 6,814,660 | B1* | 11/2004 | Cavett | 454/284 |
| 2009/0298413 | A1* | 12/2009 | Arold | 454/158 |
| 2012/0324851 | A1* | 12/2012 | Haefner et al. | 55/521 |

FOREIGN PATENT DOCUMENTS

| DE | 10 2005 048 841 | 7/2007 |
| DE | 10 2010 044 258 | 5/2011 |
| DE | 102009050548 | 5/2011 |
| JP | S43-11191 | 5/1943 |

* cited by examiner

*Primary Examiner* — Duane Smith
*Assistant Examiner* — Minh-Chau Pham
(74) *Attorney, Agent, or Firm* — Grossman, Tucker, Perreault & Pfleger, PLLC

(57) ABSTRACT

A filter element for insertion into a housing of a ventilation or air-conditioning system, including a bellows with pleated walls and pleat tips and a front face, which can be faced towards a wall of the housing, wherein a guide duct is allocated to the front face, wherein the guide duct is formed by at least one breakthrough in the pleated walls and/or in a side strip that is hemming the front face, in view of the object to indicate a mechanical coding for a filter element which ensures a unique allocation of a filter element to a housing, wherein the filter element is provided with breakthroughs and wherein the mechanical strength of pleated walls and side strips is impaired as little as possible by the breakthroughs, characterized in that the breakthrough is provided with a reinforcing.

9 Claims, 2 Drawing Sheets

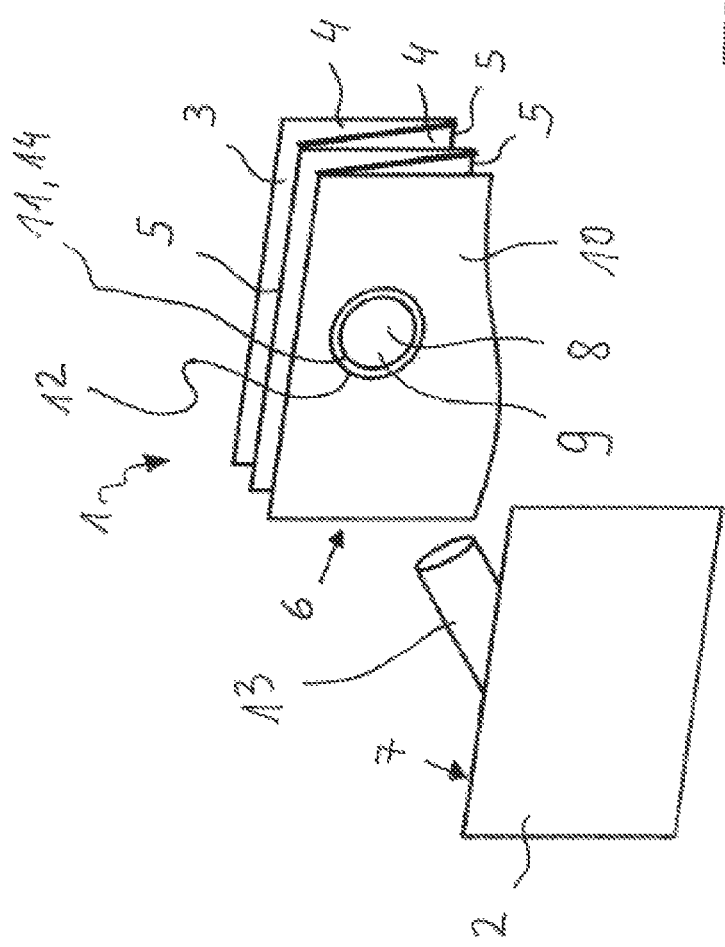

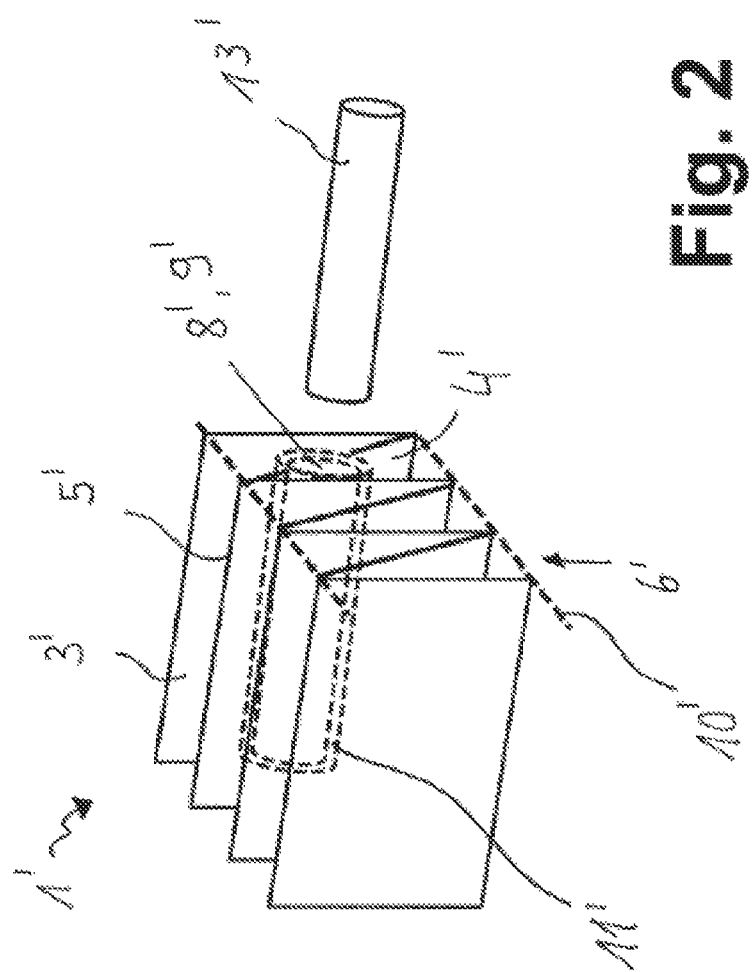

FILTER ELEMENT WITH A GUIDE DUCT THAT PENETRATES ITS PLEATED WALLS

CROSS REFERENCE TO RELATED APPLICATIONS

This application claims priority to German Patent Application No. 10 2011 113 391.0 filed on Sep. 16, 2011 and German Patent Application No. 10 2011 117 842.6 filed on Nov. 8, 2011, the disclosures of which is incorporated by reference herein in their entirety.

FIELD OF THE INVENTION

The invention relates to a filter element for insertion into a housing of a ventilation or air-conditioning system, comprising a bellows with pleated walls and pleat tips and a front face, which can be faced towards a wall of the housing, wherein a guide duct is allocated to the front face, wherein the guide duct is formed by at least one breakthrough in the pleated walls and/or in a side strip that is hemming the front face, characterized in that the breakthrough is provided with a reinforcing.

BACKGROUND

A filter element which is inserted into a housing of a ventilation system of an automobile is known from DE 10 2005 048 841 B3. With this filter arrangement, guide pins of the housing specifically match guide ducts in the filter element. This is to accomplish a mechanical coding which ensures that only a filter element that is suitable or this housing is inserted into the housing.

Furthermore, a filter element has become known through DE 10 2010 044 258 A1, which has at least one guide duct which penetrates or interrupts pleated walls.

By breaking through a pleated wall or a side strip, this removes material of the pleated wall or of the side strip. This can impair the mechanical strength of the pleated wall or of the side strip. A reduction in the mechanical strength of the pleated wall or of the side strip can especially occur in the edge zone of a breakthrough. This applies particularly to bulky and flexible material with fiber content.

The filter element known from DE 10 2005 048 841 B3 is to be centered by the breakthroughs and the guide pins. If a side strip exhibits mechanical instability in the area of a breakthrough, then a breakthrough can no longer adequately perform the function of guiding and/or centering.

Weakening the material of a pleated wall can furthermore result in forming a specified bending point. This can result in that the uniform bending of a flexible filter element is no longer possible during assembly or during installation. Besides, the geometry of a breakthrough can be deformed when the filter element is bent.

A mechanically introduced breakthrough can especially fray on its edge. When breakthroughs are introduced by mechanical means, in particular by punching, residues of the pleated walls will accumulate which can adhere to the filter element or which must be disposed of, which is costly. The adherence of residues can result in complaints/claims.

Another problem during punching or cutting is that certain pleated areas, in particular flanks of pleats, cannot be brought close enough to a punching or cutting device, because it always requires a counter-bracket to support the pleated wall.

SUMMARY

For this reason, the object of the invention is to indicate a mechanical coding for a filter element to ensure a unique allocation of the filter element to a housing, wherein the filter element is provided with breakthroughs and wherein the mechanical strength of pleated walls and side strips is impaired as little as possible due to the breakthroughs.

A filter meant for insertion into a housing of a ventilation or air conditioning system comprises a bellows with pleated walls and pleat tips and a front face, which can be faced towards a wall of the housing, wherein a guide duct is allocated to the front face, wherein the guide duct is formed by at least one breakthrough in the pleated walls and/or in a side strip which is hemming the front face.

The invention teaches that it is provided that the breakthrough is equipped with reinforcing.

The invention teaches that it has been realized that a reinforcing of the edge of breakthroughs results in stabilizing a pleated wall or a side strip. The invention teaches that the bellows of the filter element will not be provided with specified bending points which negatively impair its flexural properties. The rigidity of the pleated wall or side strips is essentially maintained, wherein the filter element can still be easily deformed, however.

The mechanical coding can particularly ensure that filter elements with sensors will be installed into a housing such that connection cables for the sensors are laid correctly. This will therefore result in a "key-keyhole" pairing and a reliable mechanical coding while forming a filter element that can be deformed without problems, wherein the mechanical strength of pleated walls and side strips is impaired as little as possible by the breakthroughs.

The object mentioned is therefore solved.

Against this background it is conceivable to design a reinforcing as a separate component, which is inserted into a breakthrough.

The breakthrough could have an edge designed as reinforcing. The edge can be designed as a material accumulation of the material of a pleated wall or of the side strip. The breakthrough can be produced cost-effectively in this way.

Against this background, a breakthrough could have been fitted thermally into the pleated walls and/or the side strip. To create breakthroughs, the filter medium and/or the side strip material must be removed. The filter medium and the side strip material are thermoplastically formed and can be displaced from the area of a subsequent breakthrough as reinforcing into its edge by suitable melting. Reinforcing can be provided for the breakthrough by the displacement of the materials into the edge. This results in a solidification of the edge. The leftovers that accumulate during a breakthrough are thus converted into reinforcing the edges.

A chamfer could be formed in a breakthrough. A chamfer in the edge of a breakthrough can be produced by thermal treatment. A chamfer assists with assembly and makes the insertion of a guide pin into a breakthrough easier. It is almost impossible to form chamfers with punching processes.

Against this background, the guide duct could be orthogonally oriented towards the pleated walls and to the pleat tips. In this way, a guide pin can be encompassed by several pleated walls, and the filter element can be centered reliably.

The guide duct could taper in the direction opposite to the direction of insertion. This will accomplish a trouble-free guiding of the filter element and a tight fit in the final position of the filter element in the housing. Against this background it is conceivable that the guide duct is conically formed.

The bellows and/or of the side strip could be produced from a thermoplastic non-woven fabric. Punching holes on the materials of the pleated wall or side strips for the provision of breakthroughs normally reduce their mechanical strengths, in particular their maximum tensile forces. In contrast, the thermal treatment results in pleated walls and side strips that are sturdy. Advantageously the edges of the breakthroughs are smooth and will not fray, since the fibers can be melted. The thermally fitted breakthroughs have a high dimensional stability, particularly during flexing of the filter element.

The reinforcing could be designed as a separate, preferably metallic component. A separate component can be heated up such that it can be entirely inserted into the bellows with partial melting of the bellows.

The separate component remains in the bellows after its partial melting. The component can be shaped in the form of a pin with a tubular receptacle for a guide pin. Metal can be heated particularly easily while maintaining a certain stability.

The pleated walls and the pleat tips can be arranged evenly spaced apart, wherein the regularity of the spacing from the breakthrough and/or from the guide duct and/or from the reinforcing remains unaffected. Advantageously, the pleated walls and the pleat tips in the area of a guide duct do not have to be arranged differently than in adjacent or other areas of the bellows. Production facilities for regularly structured bellows must not be modified such that individual pleated areas are modified. The stability of the bellows will surprisingly not be interfered with, if the pleated walls in the edge regions will be partially perforated or melted.

Particularly with small spacing between pleats relative to the size of the guide duct, a guide duct which preferably runs parallel to the pleat tips can penetrate a side strip as well as also a pleated wall in the area of a guide pin.

Surprisingly it has been shown that such penetration between the unclean gas side and the clean gas side can be sealed through the appropriate design of the guide pin or through the reinforcing which is designed as a separate component, alone. Surprisingly, a specified pleat spacing must not be modified.

Against this background, the bellows and/or the side strip could comprise activated carbon. Surprisingly it has been shown that the previously mentioned breakthroughs, guide ducts and regular pleat geometries cannot be realized even with so-called composite filter materials or composite materials with non-thermoplastic activated carbon fractions. Advantageously, not only particulate filters, but also gas or odor filters can be provided with a coding.

BRIEF DESCRIPTION OF THE DRAWINGS

FIG. 1 is a diagrammatic, perspective view of a filter element which perforates the pleated walls, and FIG. 2 is a diagrammatic perspective view of a filter element with a breakthrough, in which a separate metallic component is incorporated as reinforcing.

DETAILED DESCRIPTION

FIG. 1 is a diagrammatic illustration of a filter element 1 for insertion into a housing 2 of a ventilation or air-conditioning system, comprising a bellows 3 with pleated walls 4 and pleat tips 5 and a front face 6, which can be faced towards a wall 7 of the housing 2, wherein a guide duct 8 is allocated to the front face 6, wherein the guide duct 8 is formed by at least one breakthrough 9 in the pleated walls 4 and/or in a side strip 10 which is hemming the front face 6.

The breakthrough 9 is provided with reinforcing 11. The breakthrough 9 comprises an edge 14, formed as reinforcing 11.

Several breakthroughs 9 are provided with reinforcing 11. The breakthroughs 9 are thermally fitted into the pleated walls 4 and into the side strip 10. A chamfer 12 is formed on the front face 6 in a breakthrough 9.

The guide duct 8 is oriented orthogonally towards the pleated walls 4 and to the pleat tips 5. The bellows 3 and the side strip 10 are produced from a thermoplastic non-woven fabric.

From the wall 7 of the housing 2 a guide pin 13 protrudes, which corresponds with the guide duct 8 for producing a mechanical coding. Additional guide pins which can correspond with additional guide ducts are not shown.

The breakthrough 9 has an edge 14 which consists of thermally displaced side strip material. The edge 14, which has a material accumulation of the side strip material, is formed as reinforcing 11.

FIG. 2 is a diagrammatic illustration of a filter element 1' for insertion into a housing (not shown) of a ventilation or air-conditioning system, comprising a bellows 3' with pleated walls 4' and pleat tips 5' and a front face 6', which can be faced towards a wall (not shown) of the housing, wherein a guide duct 8' is allocated to the front face 6', wherein the guide duct 8' is formed by at least one breakthrough 9' in the pleated walls 4' and/or in a side strip 10' which is hemming the front face 6'. The side strip 10' is shown as a dotted line.

The breakthrough 9' is provided with reinforcing 11'.

The reinforcing 11' is formed as a separate metallic component. It is also conceivable, however, to use a non-metallic component, which can be thermally fitted into the bellows 3'.

The reinforcing 11' is designed in the form of a pin, and forms a receptacle for a guide pin 13'. The reinforcing 11' is firmly and permanently secured to the bellows 3' by a melting process.

For the sake of clarity, the reinforcing 11' is represented as a dotted line and is fitted into the inside of the bellows 3'. It is fitted into the bellows 3' like a sleeve and partially breaks through its pleated walls 4'.

The pleated walls 4' and the pleat tips 5' can be arranged spaced apart evenly, wherein the regularity of the spacing from the breakthrough 9' and from the guide duct 8' and from the reinforcing 11' remains unaffected. The bellows 4' are penetrated merely partially by the breakthrough 9' and/or the heat-fitted reinforcing 11'.

What is claimed is:

1. A filter element for insertion into a housing of a ventilation or air-conditioning system, comprising a bellows having pleated walls and pleat tips, defining a front face facing a wall of the housing, a side strip disposed over the pleat tips of the front face, and a guide duct formed by openings in the pleated walls and in the side strip of the front face, wherein the openings are reinforced with a metallic component.

2. The filter element according to claim 1, wherein the opening is reinforced at an edge of the opening.

3. The filter element according to claim 1, wherein the opening is formed by heating the pleated walls and optionally the side strip.

4. The filter element according to claim 1, wherein a chamfer is formed in a breakthrough.

5. The filter element according to claim 1, wherein the guide duct is oriented orthogonally towards the pleated walls and to the pleat tips.

6. The filter element according to claim 1, wherein the guide duct tapers from the front face towards an opposite face of the filter.

7. The filter element according to claim 1, wherein the bellows and optionally the side strip is/are produced from a thermoplastic non-woven fabric.

8. The filter element according to claim 1, wherein the pleated walls and pleat tips are arranged evenly spaced apart, wherein the regularity of the spacing from the opening and optionally the guide duct remain unaffected.

9. The filter element according to claim 1, wherein the bellows and optionally the side strip comprise activated carbon.

* * * * *